United States Patent
Cui et al.

(10) Patent No.: US 12,436,306 B2
(45) Date of Patent: Oct. 7, 2025

(54) THREE-DIMENSIONAL VISUALIZATION EXPRESSION METHOD FOR MULTI-SCALE GEOLOGICAL STRUCTURE MODEL

(71) Applicant: Institute of Geology and Geophysics, Chinese Academy of Sciences, Beijing (CN)

(72) Inventors: Zhendong Cui, Beijing (CN); Tao Wei, Beijing (CN); Dongxu Liu, Beijing (CN); Longcan Wang, Beijing (CN); Xuehui Zhang, Beijing (CN); Leilei Zhao, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 27 days.

(21) Appl. No.: 18/416,926

(22) Filed: Jan. 19, 2024

(65) Prior Publication Data

US 2025/0172713 A1  May 29, 2025

(30) Foreign Application Priority Data

Nov. 27, 2023 (CN) .......................... 202311589327.2

(51) Int. Cl.
*G01V 1/30* (2006.01)
(52) U.S. Cl.
CPC .............. *G01V 1/302* (2013.01); *G01V 1/306* (2013.01)
(58) Field of Classification Search
CPC ................................ G01V 1/302; G01V 1/306
See application file for complete search history.

(56) References Cited

U.S. PATENT DOCUMENTS 11,320,555 B2 * 5/2022 Mlao ...................... G01V 1/301

FOREIGN PATENT DOCUMENTS

| CN | 111627109 A | 9/2020 | |
|---|---|---|---|
| CN | 115019006 A | 9/2022 | |
| CN | 112800581 B | * 12/2023 | ............. G06F 30/20 |

OTHER PUBLICATIONS

Li, Three-dimensional Geological Modeling Methods and Applications—A Gold Belt Oilfield, 2015, MEICI Publication, pp. 283-287 (Year: 2015).*

(Continued)

*Primary Examiner* — Elias Desta
(74) *Attorney, Agent, or Firm* — Hawaii Patent Services; Nathaniel K. Fedde; Kenton N. Fedde

(57) ABSTRACT

The invention provides a three-dimensional visualization expression method for a multi-scale geological structure model, including: collecting geological exploration data which includes geophysical information, drilling information, outcrop survey information, seismic information and geological age data; performing interpolation simulation on the geological exploration data to obtain an exploration sample set; preprocessing the exploration sample set to obtain preprocessed data, the preprocessing process including data cleaning, format unification and noise removal; constructing a multi-scale geological structure model according to the preprocessed data based on a three-dimensional modeling technology; performing scale decomposition on the geological structure model using a multi-scale analysis method to form model representations at different scale levels; and converting the model representations into 3D visualization images using a 3D graphics processing technology. The invention can effectively improve the expression ability of geological model and user experience, (Continued)

and has important practical application value for geological exploration and resource assessment.

7 Claims, 1 Drawing Sheet

(56) References Cited

OTHER PUBLICATIONS

Merged English Translation of CN-112800581-B (Year: 2020).*
Zhang Ming-ming et al., "Comparative Study Between Three-Dimensional Strata Modeling and Surface Model Interpolation", Geology of Anhui, Sep. 2015, pp. 182-186, vol. 25 No. 3.
CNIPA, Notification of a First Office Action for CN202311589327.2, Sep. 29, 2024.
Institute of Geology and Geophysics, Chinese Academy of Sciences (Applicant), Replacement claims (allowed) of CN202311589327.2, Nov. 5, 2024.
CNIPA, Notification to grant patent right for invention in CN202311589327.2, Feb. 20, 2025.

\* cited by examiner

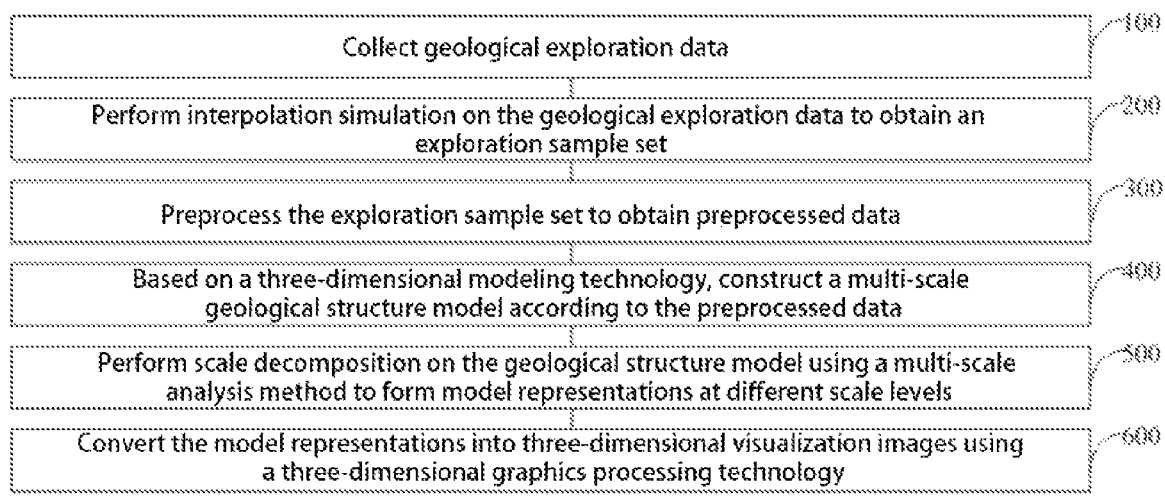

THREE-DIMENSIONAL VISUALIZATION EXPRESSION METHOD FOR MULTI-SCALE GEOLOGICAL STRUCTURE MODEL

CROSS-REFERENCE

This application claims the benefit of priority from China Patent Application No. CN 2023115893272 filed on Nov. 27, 2023.

TECHNICAL FIELD

The present invention relates to the field of three-dimensional visualization design, in particular to a three-dimensional visualization expression method for a multi-scale geological structure model.

BACKGROUND

With the development of science and technology, geological exploration has an increasing demand on visualization technology. Existing geological model visualization methods often have limitations when processing large-scale complex data, such as low resolution, slow processing speed, and difficulty in expressing multi-scale geological characteristics, which limit the effects of geological models in practical applications.

SUMMARY

In order to overcome the shortcomings in the existing technology, an object of the present invention is to provide a three-dimensional visualization expression method for a multi-scale geological structure model.

In order to achieve the above object, the present invention provides the following scheme:

A three-dimensional visualization expression method for a multi-scale geological structure model, including following steps:
  collecting geological exploration data, where the geological prospecting data includes geophysical prospecting information, drilling information, outcrop survey information, seismic information and geological age data;
  performing interpolation simulation on the geological exploration data to obtain an exploration sample set;
  preprocessing the exploration sample set to obtain preprocessed data, where the preprocessing process includes data cleaning, format unification and noise removal;
  constructing a multi-scale geological structure model according to the preprocessed data based on a three-dimensional modeling technology;
  performing scale decomposition on the geological structure model using a multi-scale analysis method to form model representations at different scale levels; and
  converting the model representations into three-dimensional visualization images using a three-dimensional graphics processing technology.

Preferably, the performing interpolation simulation on the geological exploration data to obtain an exploration sample set includes:
  based on a variogram analysis method, performing spatial analysis on the geological exploration data to evaluate a spatial correlation of each data in the geological exploration data; and
  according to the type of each data in the geological exploration data and the spatial correlation, selecting a corresponding geological data interpolation method to interpolate each data in the geological exploration data to obtain the exploration sample set.

Preferably, the geological data interpolation method includes Kriging interpolation, inverse distance weighted interpolation, radial basis function interpolation, a triangulation method and a smooth surface method.

Preferably, the data cleaning includes: filling missing values of the data and deleting abnormal values of the data.

Preferably, the constructing a multi-scale geological structure model according to the preprocessed data based on a three-dimensional modeling technology includes:
  constructing a microphase scale model, a structural model and an initial geological model based on the preprocessed data;
  based on the microphase scale model, the structural model and the initial geological model, constructing a flow simulation process in a real geological environment according to a preset scaling strategy; and
  updating the microphase scale model, the structural model and the initial geological model according to the flow simulation process to obtain the geological structure model.

Preferably, the performing scale decomposition on the geological structure model using a multi-scale analysis method to form model representations at different scale levels includes:
  acquiring a target analysis area;
  constructing high-resolution sub-models for a part of the geological structure model corresponding to the target analysis area, where the high-resolution sub-models are configured to capture geological features at set scales, and the geological features include rock formations, faults and pore structures;
  performing model integration on each of the high-resolution sub-models to obtain a large-scale model; and
  performing multi-scale simulation on the target analysis area based on the large-scale model to demonstrate the model representations at different scales.

Preferably, the converting the model representations into three-dimensional visualization images using a three-dimensional graphics processing technology includes:
  constructing a geological model library and a BIM component library according to the model representations;
  building a three-dimensional visualization information model according to the geological model library and BIM component library based on Dynamo visual programming and a Revit parametric modeling method; and
  performing visualization display according to the three-dimensional visualization information model to obtain the three-dimensional visualization images.

Preferably, the building a three-dimensional visualization information model according to the geological model library and BIM component library based on Dynamo visual programming and a Revit parametric modeling method includes:
  making a parameterized family;
  extracting positioning information of model components;
  extracting parameter information of the model components;
  organizing and summarizing the positioning information and parameter information of the model components to form an input data form that is standardized in format and readable by a Dynamo tool; and running the Dynamo tool in Revit software for visual programming, invoking the parameterized component family, reading the input data form, adjusting component family parameters in batches, and building the three-dimensional visualization information model.

According to the specific embodiments provided by the present invention, the present invention discloses the following technical effects:

The present invention provides a three-dimensional visualization expression method for a multi-scale geological structure model, including following steps: collecting geological exploration data, where the geological prospecting data includes geophysical prospecting information, drilling information, outcrop survey information, seismic information and geological age data; performing interpolation simulation on the geological exploration data to obtain an exploration sample set; preprocessing the exploration sample set to obtain preprocessed data, where the preprocessing process includes data cleaning, format unification and noise removal; constructing a multi-scale geological structure model according to the preprocessed data based on a three-dimensional modeling technology; performing scale decomposition on the geological structure model using a multi-scale analysis method to form model representations at different scale levels; and converting the model representations into three-dimensional visualization images using a three-dimensional graphics processing technology. The present invention can effectively improve the expression ability of the geological model and the user experience, and has important practical application value for geological exploration and resource assessment.

BRIEF DESCRIPTION OF DRAWINGS

In order to explain the technical schemes in the embodiments of the present invention or the existing technology more clearly, the drawings needed to be used in the embodiments will be briefly introduced below. Apparently, the drawings in the following description are only some of the drawings of the present invention. Those having ordinary skill in the art can also obtain other drawings according to these drawings without making creative efforts.

FIG. 1 is a flow chart of a method provided by an embodiment of the present invention.

DETAILED DESCRIPTION OF EMBODIMENTS

The technical schemes in the embodiments of the present invention will be clearly and completely described below with reference to the drawings in the embodiments of the present invention. Apparently, the described embodiments are only some of the embodiments of the present invention, rather than all the embodiments. Based on the embodiments of the present invention, all other embodiments obtained by those having ordinary skill in the art without making creative efforts fall within the scope of protection of the present invention.

An object of the present invention is to provide a three-dimensional visualization expression method for a multi-scale geological structure model, which can effectively improve the expression ability of the geological model and the user experience, and has important practical application value for geological exploration and resource assessment.

In order to make the above objects, features and advantages of the present invention more obvious and understandable, the present invention will be described in further detail below with reference to the drawings and specific embodiments.

FIG. 1 is a flow chart of a method provided by an embodiment of the present invention. As shown in FIG. 1, the present invention provides a three-dimensional visualization expression method for a multi-scale geological structure model, including following steps:

In a step of 100, geological exploration data is collected, where the geological prospecting data includes geophysical prospecting information, drilling information, outcrop survey information, seismic information and geological age data.

In a step of 200, interpolation simulation is performed on the geological exploration data to obtain an exploration sample set.

In a step of 300, the exploration sample set is preprocessed to obtain preprocessed data, where the preprocessing process includes data cleaning, format unification and noise removal.

In a step of 400, a multi-scale geological structure model is constructed according to the preprocessed data based on a three-dimensional modeling technology.

In a step of 500, scale decomposition is performed on the geological structure model using a multi-scale analysis method to form model representations at different scale levels.

In a step of 600, the model representations are converted into three-dimensional visualization images using a three-dimensional graphics processing technology.

Specifically, this embodiment aims to improve the expression clarity and visualization effect of the geological structure model so as to better conduct geological exploration and resource assessment. The method includes collection of geological data, model construction, multi-scale processing and three-dimensional visualization display.

Preferably, the performing interpolation simulation on the geological exploration data to obtain an exploration sample set includes:
based on a variogram analysis method, performing spatial analysis on the geological exploration data to evaluate a spatial correlation of each data in the geological exploration data; and
according to the type of each data in the geological exploration data and the spatial correlation, selecting a corresponding geological data interpolation method to interpolate each data in the geological exploration data to obtain the exploration sample set.

Further, in this embodiment, based on the data acquired from geophysical prospecting, drilling, outcrop survey, and the like, geometric models, attribute models, and the like of different scales are respectively constructed by means of the interpolation method, a random simulation algorithm, and the like following the idea of from coarse to fine, from low resolution to high resolution, from point-line-surface-body, so as to achieve three-dimensional visualization and digital expression of geological data.

Preferably, the geological data interpolation method includes Kriging interpolation, inverse distance weighted interpolation, radial basis function interpolation, a triangulation method and a smooth surface method.

Optionally, Kriging interpolation is a geostatistical method based on the best linear unbiased estimate that can take into account the spatial correlation and directionality of data. Inverse distance weighted (IDW) interpolation is a simple deterministic method that assigns weights according to the inverse of distance. Radial basis function (RBF)

interpolation is a method that uses radial basis functions as weights. Commonly used functions include Gaussian functions, polynomial functions, and the like. The triangulation (TIN) method and the smooth surface method are methods that connect data points to form triangular meshes and perform interpolation on these meshes.

Preferably, the data cleaning includes: filling missing values of the data and deleting abnormal values of the data.

Preferably, the constructing a multi-scale geological structure model according to the preprocessed data based on a three-dimensional modeling technology includes:
  constructing a microphase scale model, a structural model and an initial geological model according to the preprocessed data;
  based on the microphase scale model, the structural model and the initial geological model, constructing a flow simulation process in a real geological environment according to a preset scaling strategy; and
  updating the microphase scale model, the structural model and the initial geological model according to the flow simulation process to obtain the geological structure model.

Specifically, in this embodiment, 4D seismic data may also be acquired in real time, and the geological structure model maybe updated and optimized in real time through the 4D seismic data.

Preferably, the performing scale decomposition on the geological structure model using a multi-scale analysis method to form model representations at different scale levels includes:
  acquiring a target analysis area;
  constructing high-resolution sub-models for a part of the geological structure model corresponding to the target analysis area, where the high-resolution sub-models are configured to capture geological features at set scales, and the geological features include rock formations, faults and pore structures;
  performing model integration on each of the high-resolution sub-models to obtain a large-scale model; and
  performing multi-scale simulation on the target analysis area based on the large-scale model to demonstrate the model representations at different scales.

Specifically, the specific technical routes of the model representations in this embodiment are as follows:
1) understanding a large-scale model: analyzing an existing large-scale geological model and understanding its basic structure and main geological features, and determining key geological units and interfaces in the model;
2) determining target areas: selecting target areas that need scale decomposition, where these areas are usually parts of special significance to the overall model, such as areas with complex geological structures or high economic value;
3) collecting detailed data: conducting more detailed data collection on the target areas, including drilling data, seismic data, core analysis, geophysical surveys, and the like, where the more detailed the data is, the more reliable the decomposed model is;
4) creating high-resolution sub-models: creating high-resolution geological models of the target areas using the detailed data collected, where the sub-models should be able to capture geological features at smaller scales, such as fine rock layers, faults, pore structures, and the like;
5) performing calibration and verification: calibrating the sub-models based on actual field data or other available information, and verifying the accuracy of the model to ensure that it reflects true geology;
6) integrating into the large-scale model: integrating the high-resolution sub-models back into the large-scale model to ensure continuity of geological features and properties at the interface between models at different scales;
7) performing multi-scale simulation: performing multi-scale simulation using the integrated model to study geological processes at different scales, that is, obtain model representations of all models; and
8) analyzing results: evaluating the impact of the geological features at finer scales on the overall model.

Preferably, the converting the model representations into three-dimensional visualization images using a three-dimensional graphics processing technology includes:
  constructing a geological model library and a BIM component library according to the model representations;
  building a three-dimensional visualization information model according to the geological model library and BIM component library based on Dynamo visual programming and a Revit parametric modeling method; and
  performing visualization display according to the three-dimensional visualization information model to obtain the three-dimensional visualization images.

Specifically, in this embodiment, the parametric modeling method of Dynamo+Revit is adopted to achieve the goals of reducing modeling workload, shortening modeling time, improving level of model definition, and reducing errors; and the parametric modeling method of Dynamo+Revit is adopted to achieve the purpose of uniformly controlling flow simulation processes of the geological model, and achieve the goals of reducing modeling workload, shortening modeling time, improving level of model definition, and avoiding errors.

Preferably, the building a three-dimensional visualization information model according to the geological model library and BIM component library based on Dynamo visual programming and a Revit parametric modeling method includes:
  making a parameterized family;
  extracting positioning information of model components;
  extracting parameter information of the model components;
  organizing and summarizing the positioning information and parameter information of the model components to form an input data form that is standardized in format and readable by a Dynamo tool; and
  running the Dynamo tool in Revit software for visual programming, invoking the parameterized component family, reading the input data form, adjusting component family parameters in batches, and building the three-dimensional visualization information model.

Further, in this embodiment, a GPU-accelerated volume rendering technology is also adopted to achieve real-time visualization of complex geological structures, and is combined with a multi-scale analysis technology to allow users to seamlessly switch between different levels of detail through level-of-detail control, so as to adapt to different exploration and analysis needs.

Each embodiment in this specification is described in a progressive manner. Each embodiment focuses on its differences from other embodiments. The same and similar parts between the various embodiments can be referred to each other.

Specific embodiments are used herein to illustrate the principles and implementation methods of the present invention. The description of the above embodiments is only used to help understand the method and its core idea of the present invention. Meanwhile, for those having ordinary skill in the art, there will be changes in the specific implementation and application scope according to the idea of the present invention. In summary, the content of this specification should not be construed as a limitation of the present invention.

What is claimed is:

1. A three-dimensional visualization expression method for a multi-scale geological structure model, comprising following steps: collecting geological exploration data, wherein the geological exploration data comprises geophysical prospecting information, drilling information, outcrop survey information, seismic information and geological age data; performing interpolation simulation on the geological exploration data to obtain an exploration sample set; preprocessing the exploration sample set to obtain preprocessed data, wherein the preprocessing comprises data cleaning, format unification and noise removal; constructing a multi-scale geological structure model according to the preprocessed data based on a three-dimensional modeling technology; performing scale decomposition on the geological structure model using a multi-scale analysis method to form model representations at different scale levels; and converting the model representations into three-dimensional visualization images using a three-dimensional graphics processing technology; and wherein the constructing a multi-scale geological structure model according to the preprocessed data based on a three-dimensional modeling technology comprises: constructing a microphase scale model, a structural model and an initial geological model according to the preprocessed data; based on the microphase scale model, the structural model and the initial geological model, constructing a flow simulation process in a real geological environment according to a preset scaling strategy; and updating the microphase scale model, the structural model and the initial geological model according to the flow simulation process to obtain the geological structure model.

2. The three-dimensional visualization expression method for the multi-scale geological structure model of claim 1, wherein the performing interpolation simulation on the geological exploration data to obtain an exploration sample set comprises: based on a variogram analysis method, performing spatial analysis on the geological exploration data to evaluate a spatial correlation of each data in the geological exploration data; and according to the type of each data in the geological exploration data and the spatial correlation, selecting a corresponding geological data interpolation method to interpolate each data in the geological exploration data to obtain the exploration sample set.

3. The three-dimensional visualization expression method for the multi-scale geological structure model of claim 2, wherein the geological data interpolation method comprises Kriging interpolation, inverse distance weighted interpolation, radial basis function interpolation, a triangulation method and a smooth surface method.

4. The three-dimensional visualization expression method for the multi-scale geological structure model of claim 1, wherein the data cleaning comprises: filling missing values of the data and deleting abnormal values of the data.

5. The three-dimensional visualization expression method for the multi-scale geological structure model of claim 1, wherein the performing scale decomposition on the geological structure model using a multi-scale analysis method to form model representations at different scale levels comprises: acquiring a target analysis area; constructing high-resolution sub-models for a part of the geological structure model corresponding to the target analysis area, wherein the high-resolution sub-models are configured to capture geological features at set scales, and the geological features comprise rock formations, faults and pore structures; performing model integration on each of the high-resolution sub-models to obtain a large-scale model; and performing multi-scale simulation on the target analysis area based on the large-scale model to demonstrate the model representations at different scales.

6. The three-dimensional visualization expression method for the multi-scale geological structure model of claim 1, wherein the converting the model representations into three-dimensional visualization images using a three-dimensional graphics processing technology comprises: constructing a geological model library and a Building Information Modeling (BIM) component library according to the model representations; building a three-dimensional visualization information model according to the geological model library and BIM component library based on visual programming and a parametric modeling method; and performing visualization display according to the three-dimensional visualization information model to obtain the three-dimensional visualization images.

7. The three-dimensional visualization expression method for the multi-scale geological structure model of claim 6, wherein the building a three-dimensional visualization information model according to the geological model library and BIM component library based on visual programming and a Revit-parametric modeling method comprises: making a parameterized family; extracting positioning information of model components; extracting parameter information of the model components; organizing and summarizing the positioning information and parameter information of the model components to form an input data form that is standardized in format and readable by a tool; and running the tool in software for visual programming, invoking the parameterized family, reading the input data form, adjusting component family parameters in batches, and building the three-dimensional visualization information model.

* * * * *